(12) United States Patent
Choksey et al.

(10) Patent No.: US 9,058,466 B1
(45) Date of Patent: Jun. 16, 2015

(54) ENABLING SECURITY OF A COMPUTER SYSTEM

(75) Inventors: Dhruv Choksey, Roseville, CA (US); Kevin Boyum, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1771 days.

(21) Appl. No.: 12/259,387

(22) Filed: Oct. 28, 2008

(51) Int. Cl.
*G06F 21/00* (2013.01)
*G06F 21/34* (2013.01)
*H04L 29/06* (2006.01)

(52) U.S. Cl.
CPC .............. *G06F 21/00* (2013.01); *G06F 21/34* (2013.01); *H04L 63/107* (2013.01)

(58) Field of Classification Search
CPC ............ H04L 63/0492; H04L 63/0853; H04L 63/107; G06F 21/00; G06F 21/34
USPC .............. 713/184, 202; 382/115; 455/41, 411
See application file for complete search history.

(56) References Cited

U.S. PATENT DOCUMENTS

| 6,219,439 | B1 * | 4/2001 | Burger | 382/115 |
| 2002/0090912 | A1 * | 7/2002 | Cannon et al. | 455/41 |
| 2002/0123325 | A1 * | 9/2002 | Cooper | 455/411 |
| 2004/0181695 | A1 * | 9/2004 | Walker | 713/202 |

\* cited by examiner

Primary Examiner — Syed Zaidi
(74) Attorney, Agent, or Firm — Wagner Blecher LLP (57) ABSTRACT

Enabling security of a computer system. Physical proximity of an authorized user with the computer system is detected without requiring the authorized user to physically access the interior of the computer system is monitored. In response to detecting the physical proximity of an authorized user, the authorized user is allowed access to privileged operations of the computer system.

20 Claims, 8 Drawing Sheets

ENABLING SECURITY OF A COMPUTER SYSTEM

FIELD

Embodiments of the present invention relate generally to computer systems.

BACKGROUND

Computer systems have the ability to be configured to provide security in many different ways. In many situations computer systems are configured so as to prevent a user from performing privileged operations by remote access. One configuration is to restrict access to privileged operations by requiring the user to physically open the computer system chassis to perform the privileged operations. Often the user must open the computer system chassis while the computer is running to perform the privileged operation.

Difficulties and dangers exist when a user is required to physically move or open a system including its chassis to perform these types of operations. While the system is running there are moving parts and electrical currents which pose a risk to a user who must place a hand or other object into the system to perform these types of operations. Some computer systems are also difficult to open which difficulty may be compounded if the user is required to open the system while it is running. Additionally, implementing the hardware to perform these types of operations inside of the system and requiring the user to physically open the system expend time and resources.

SUMMARY

Various embodiments of the present technology, enabling security of a computer system, are described herein. Physical proximity of an authorized user is detected with the computer system without requiring the authorized user to physically access the interior of the computer system is monitored. In response to detecting the physical proximity of an authorized user, the authorized user is allowed access to privileged operations of the computer system.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "monitoring", "allowing", "prohibiting", "prompting", "determining", "generating", "displaying", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical and mechanical computers.

Embodiments of the present technology are for detecting the physical presence of an authorized user of a computer system, in proximity to the computer system, and then allow the authorized user to perform privileged operations. For example, most computer systems have the ability to allow the user to carry out privileged operations which include the ability to clear the on-board non-volatile data, but require the user to physically open the computer system's case or chassis and physically move a jumper located on the logic board. It should be appreciated that privileged operations include, but are not limited to clearing the on board system memory on the logic board, pushing a button or moving a jumper located inside the computer system, any operation that requires the user to open the computer system's case or chassis for security or administrative purposes, etc.

Embodiments of the present technology would allow such privileged operations to be carried out without the necessity of opening the computer system's case or chassis, but at the same time provide a secure environment in which only users who are present and in physical proximity to the computer system be allowed to perform the privileged operations. By requiring the user to be in physical proximity to the computer system to carry out privileged operations, the security of the computer system is enabled because then it is ensured that an authorized user will perform the privileged operation. By allowing the privileged operations to take place exterior to the computer system, danger to the user from entering the computer system's chassis is decreased. The invention also has the ability to save time and resources.

Overview of Discussion

The discussion will begin with an overview of an environment comprising a computer system in a secure facility, where physical access to the computer system is limited to authorized users. The role of physical proximity security, will be demonstrated to ensure that access to privileged operations is limited to authorized users. The discussion will then focus on embodiments and methods of the present technology that provide physical proximity security for a computer system. It should be appreciated that authorized users include those who use have permission to use the computer system and perform privileged operations, authorized system administrators, other users of the computer system but the term authorized user is not limited to any one type of computer user.

The discussion will demonstrate various hardware, software, and firmware components that are used with and in the computer system for enabling the security of the computer system. The various components are used to allow the computer system to detect when a user is present and physically close to the computer system and whether the user is authorized to perform privileged operations. It should be appreciated that various configurations of the computer system may or may not include the computer system being located in a secure facility. Furthermore, the computer system and its methods may include some, all, or none of the hardware, software, and firmware components discussed below.

Embodiments of a System for Physical Proximity Security

Figure 1:
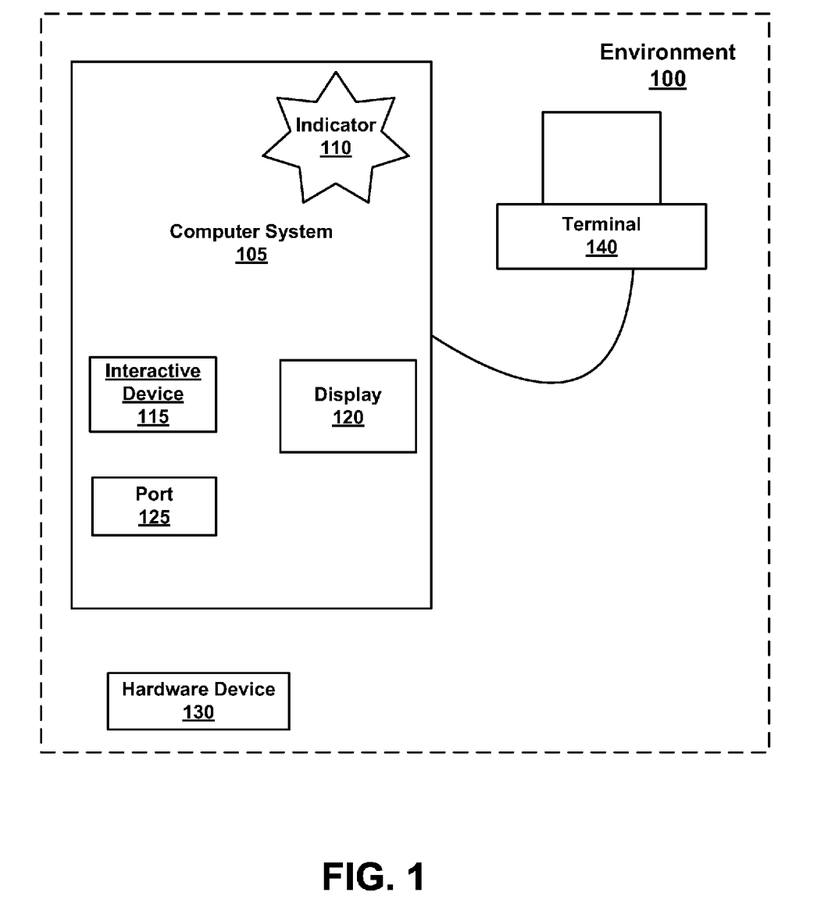
FIG. 1 illustrates a block diagram of an example computer system comprising multiple devices in accordance with embodiments of the present technology.

With reference now to FIG. 1, a block diagram of an example environment comprising a computer system in a facility with limited access is shown in accordance with embodiments of the present technology. Environment 100 includes a computer system 105 comprising an indicator 110, an interactive device 115, a display 120, and a port 125. Additionally, coupled with computer system 105 is a terminal 140. FIG. 1 also contains a hardware key 130 which is to be coupled with port 125. Environment 100 comprises components that may or may not be used with different embodiments of the present technology and should not be construed to limit the present technology.

Figure 2:
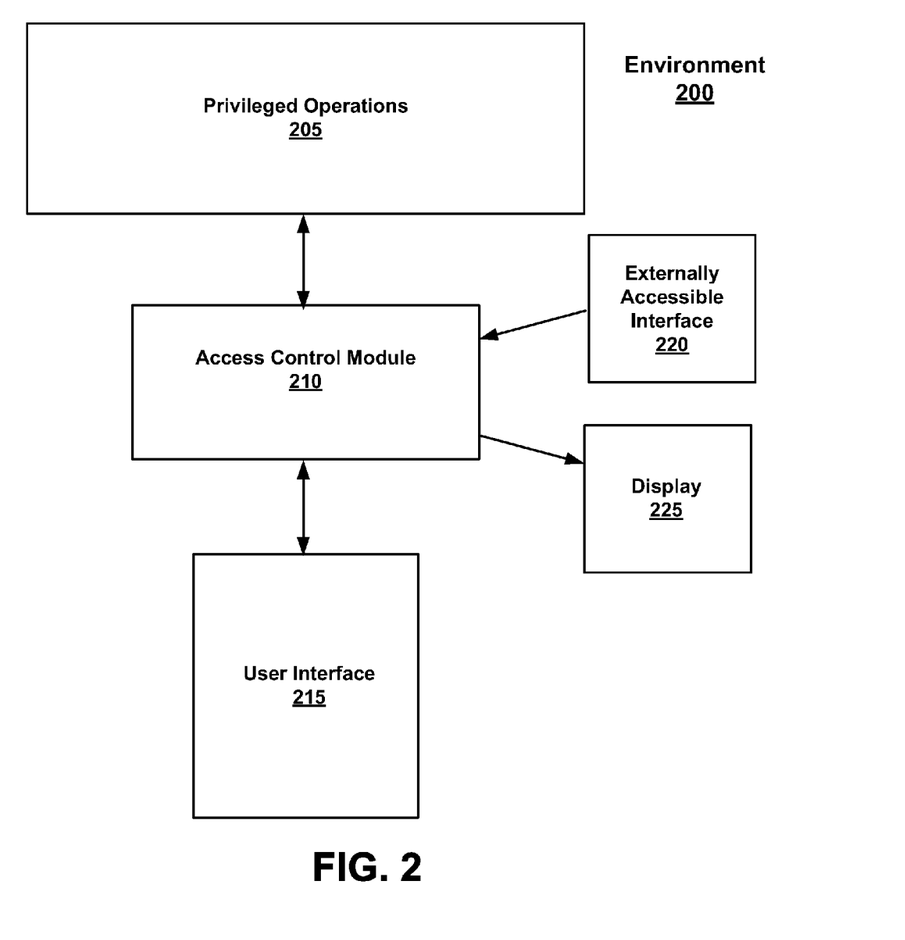
FIG. 2 illustrates a block diagram of an access control module in accordance with one embodiment.

With reference now to FIG. 2, a block diagram of an example computer system 105 (as shown in FIG. 1) comprising an access control module 210, coupled with an externally accessible interface 220, a display 225, a user interface 215, and privileged operations 205. It should be appreciated that the components of computer system 105 can be implemented as software, hardware, firmware, or any combination thereof.

Figure 5:
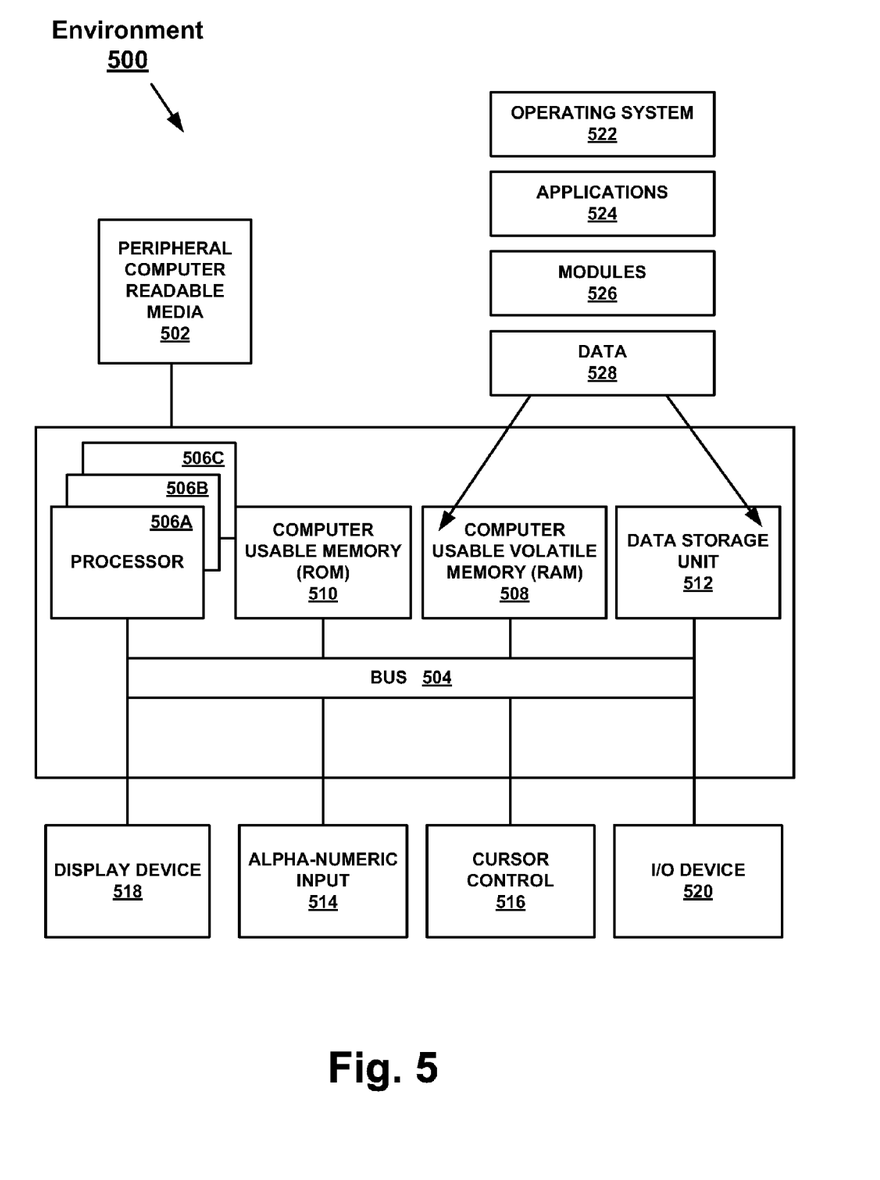
FIG. 5 illustrates a diagram of an example computer system upon which embodiments of the present technology may be implemented.

The systems in environment 100 and environment 200 are designed for access control module 210 to detect the physical proximity of an authorized user, allow access to privileged operations and do so in manner using various components in various configurations as will be described below. It should be appreciated that the access control module may be hardware, software, or firmware and may use any of the components in FIGS. 1 and 2 in any combination, but is not limited to using the components in FIGS. 1 and 2. Moreover, it should be appreciated that access control module 210 can be a standalone component or distributed across existing components of the computer system. For instance, it should be appreciated that different functions of access control module 210 may be distributed across the components of environment 500, such as processors 506 a-b, computer usable memory (ROM) 510, computer usable volatile memory (RAM) 508, I/O device 520 and other components of environment 500 (as shown in FIG. 5).

Referring to FIG. 1, in one embodiment, access control module 210 (as shown in FIG. 2) generates a security key which is displayed on display 120. For example, display 120 may be a liquid crystal display (LCD) screen, a cathode ray tube (CRT) monitor, a flashing light, a speaker, or any other screen, indicator or speaker capable of conveying the security key to the user. The security key may be a string of alphanumeric characters, a word or phrase, a number, a pattern, a sound, a pattern of flashing lights, or any other unique code. The security key may be short or long, but is not limited in length. The user may enter in the security key at a keyboard or some other input device which may be connected to terminal 140. Thus, for a user to perform privileged operations the user must first be located at or near the computer system to receive the security key and then enter into the computer system. Security is enabled because it is assumed that only authorized users are allowed physical access to the computer system.

In one embodiment, the externally accessible interface 220 is port 125 which allows access control module 210 (as shown in FIG. 2) to detect physical proximity of a user. Port 125 may be a physical port part of computer system 105 which is externally accessible. For example, port 125 may be a universal serial bus port (USB), an Ethernet port, a network port, a recommended standard 232 (RS-232) also known as a serial port, or any other physical port part of computer system 105.

In the present embodiment, access control module 210 will not allow privileged operations to be performed until an authorized user has coupled port 125 with hardware device 130. Furthermore, in one embodiment, hardware device 130 is preconfigured in a way that makes it unique and in such a way that the present technology will recognize hardware device 130 when coupled with port 125. Thus, for a user to perform privileged operations the user must first have the preconfigured hardware device 130 in the user's possession and then couple hardware device 130 with port 125. Security is enabled because it is assumed that only authorized users have possession hardware device 130 and allowed physical access to the computer system.

In one embodiment, the externally accessible interface 220 is interactive device 115 which allows access control module 210 (as shown in FIG. 2) to detect physical proximity of a user. Interactive device 115 may be an existing button or switch located on computer system 105 which is externally accessible. For example, interactive device 115 may be an existing locator button that indicates physical proximity when pressed for a predetermined amount of time. Interactive device 115 may also be a button, switch or any other type of hardware added to computer system 105 capable of indicating or sending a signal to computer system 105 after some user initiated interaction with the hardware.

Additionally, in one embodiment, interactive device 115 is a switch located on the computer system. Thus, for an authorized user to perform privileged operations the user must first change the position of the switch. Security is enabled because it is assumed that only authorized users have physical access to the computer system.

In one embodiment, indicator 110 is externally located to computer system 105 and indicates when a user is allowed access to privileged operations of computer system 105. Indicator 110 is capable of indicating to the user of computer system 105 that access is allowed to perform privileged operations 205 (as shown in FIG. 2). For example, indicator 110 may be a light, a light bulb, a light emitting diode (LED), an LCD screen, a speaker, any type of a device that emits sound or light, or any other component that would make some kind of indication to the user. Thus a user is informed when access is allowed to privileged operations which may indicated that an unwanted user is allowed access to privileged operations. The indicator may also serve to remind the user that access to privileged operations is allowed so that the user may terminate such access when then user is finished performing privileged operations, therefore the computer system is not left in a state where it would allow access to privileged operations to any user.

Referring now to FIG. 2, in one embodiment access control module 210 is communicatively coupled with externally accessible interface 220 and controls access to privileged operations 205 of computer system 105 (as shown in FIG. 1). Access control module 210 is capable detecting when the user is in physical proximity to computer system 105 (as shown in FIG. 1) and of allowing and denying access to privileged operations 205. For example, access control module 210 may be a computer processor chip connected to a bus which is connected to memory, or may be any other type of control module. It should be appreciated that access control module 210 may be implemented as software, hardware, firmware, or any combination thereof.

Furthermore, in one embodiment, access control module 210 prohibits access to privileged operations 205 after a predetermined amount of time. For example, access control module 210 may be coupled with a clock or some other type of time device that will allow access control module 210 to track the time once the user is granted access to privileged operations 205. In such an embodiment, this can be described as what is known in the art as an automatic timeout. Therefore, an authorized user is required to demonstrate his or her physical presence each interval after the predetermined time has expired. Security is further enabled by requiring the computer system to regularly detect the authorized user's physical presence and because the computer system will not be left in a state where it will allow any user to perform privileged operations for an indefinite period of time.

In one embodiment access control module 210 is configured to prompt a user for a special command and is able to determine that the user is in physical proximity with computer system 105 (as shown in FIG. 1) provided the user entered the special command correctly. For example, access control module 210 may be a computer processor chip connected to a bus which is connected to memory, or may be implemented as software, hardware, firmware, or any combination thereof. By requiring a special command, the present technology adds another layer of security because the present technology may detect an authorized user with any of the means discussed herein and still require a correct special command be entered before allowing access to privileged operations. It should be appreciated that the special command can be a predetermined password, a command recognized by the access control module, or any other predetermined command.

Furthermore, in one embodiment, the present technology will only allow the special command to be entered using an input device or terminal that is physically connected with and in proximity to the computer system. Thus security is enabled because only authorized users who have access to the space where the computer system is located will be able to enter a correct special command and be allowed to perform privileged operations.

In another embodiment access control module 210 is configured to generate a security key, to prompt a user for the security key and is able to determine that the user is in physical proximity with computer system 105 (as shown in FIG. 1) provided the user entered the security key correctly. The security key may be generated randomly or selected from a list of predetermined security keys. For example, access control module 210 may be a computer processor chip connected to a bus which is connected to memory which is capable of generating random security keys, or may be implemented as software, hardware, firmware, or any combination thereof. The user may enter in the security key at a keyboard or some other input device which may be connected to terminal 140 (as shown in FIG. 1).

In one embodiment user interface 215 is coupled communicatively with access control module 210. User interface 215 is capable of receiving input from a user and relaying the input to access control module 210. User interface 215 is also capable of receiving input from access control module 210 and relaying the input the user. For example, user interface 215 may be a terminal 140 (as shown in FIG. 1) exterior to computer system 105 (as shown in FIG. 1), a laptop computer connected to computer system 105 (as shown in FIG. 1), hardware components built into computer system 105 (as shown in FIG. 1) which may comprise a screen or monitor, a keyboard or other buttons, or may be any other type of user interface designed to interface a computer system with a computer user.

Operation

More generally, in embodiments in accordance with the present invention, physical proximity security is utilized to ensure that an authorized user is physically present and in proximity to the computer system. Such a method of physical proximity security is useful to enable efficient performance of privileged operations which become less dangerous and require less time and resources.

Figure 3:
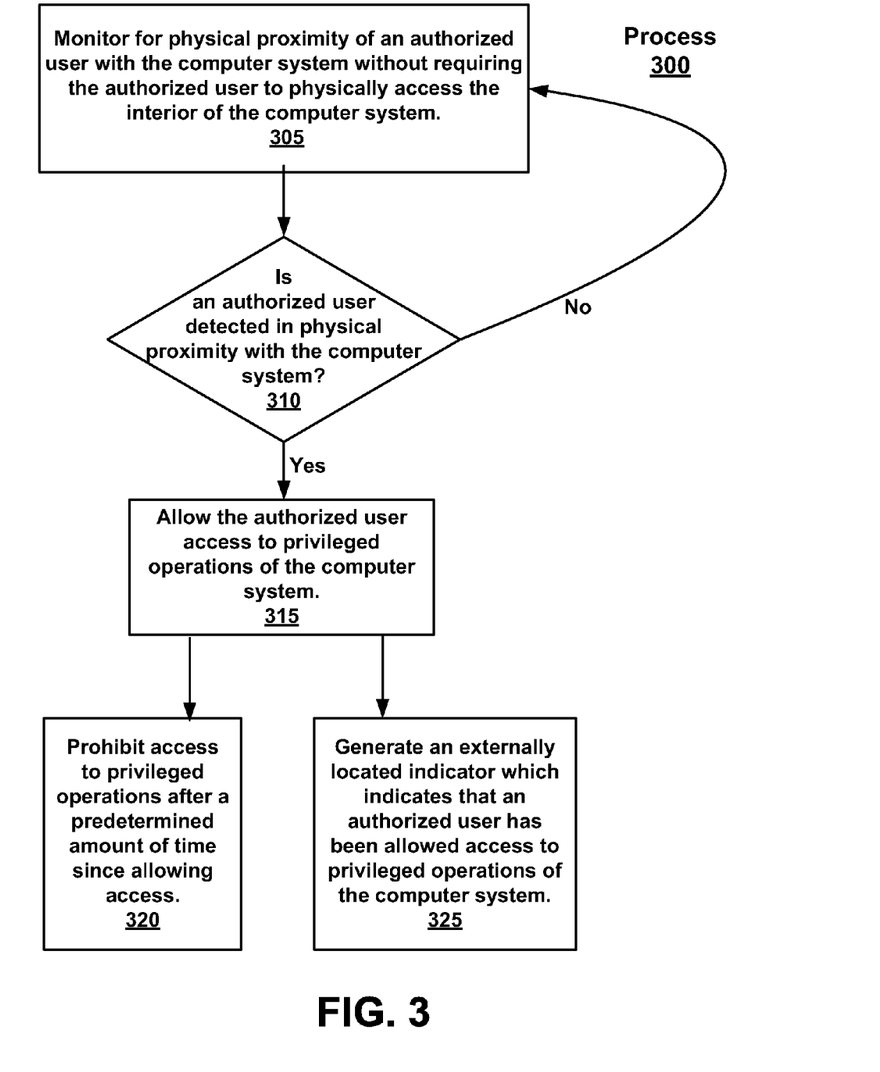
FIG. 3 illustrates a flowchart of an example method for enabling security of a computer system in accordance with embodiments of the present technology.

FIG. 3 is a flowchart illustrating a process 300 for enabling security of a computer system, in accordance with one embodiment of the present invention. In one embodiment, process 300 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 300 is performed by access control module 210 of FIG. 2.

At 305, in one embodiment, physical proximity of an authorized user is monitored with a computer system without requiring the authorized user to physically access the interior of the computer system. For example, a computer system includes a subsystem which allows for privileged operations to be performed and is constantly monitoring ports or other inputs into the computer system for the physical proximity of an authorized user. Such a subsystem allows the performance of privileged operations without the user physically accessing or opening the computer system's case or chassis. It should be appreciated that the subsystem can be, but is not limited to a platform, hardware, software or firmware or any combination thereof. In one example, the computer system allows the privileged operations to be performed using a command line interface on a laptop computer connected to the computer system.

FIGS. 4a-4d describe different embodiments of monitoring for and detecting physical proximity with a computer system without requiring a user to access the interior of the computer system's case or chassis. These are examples and are not intended to limit embodiments of the present technology. In one embodiment, processes 400, 420, 450 and 470 are carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, processes 400, 420, 450 and 470 are performed by access control module 210 of FIG. 2.

Figure 4A:
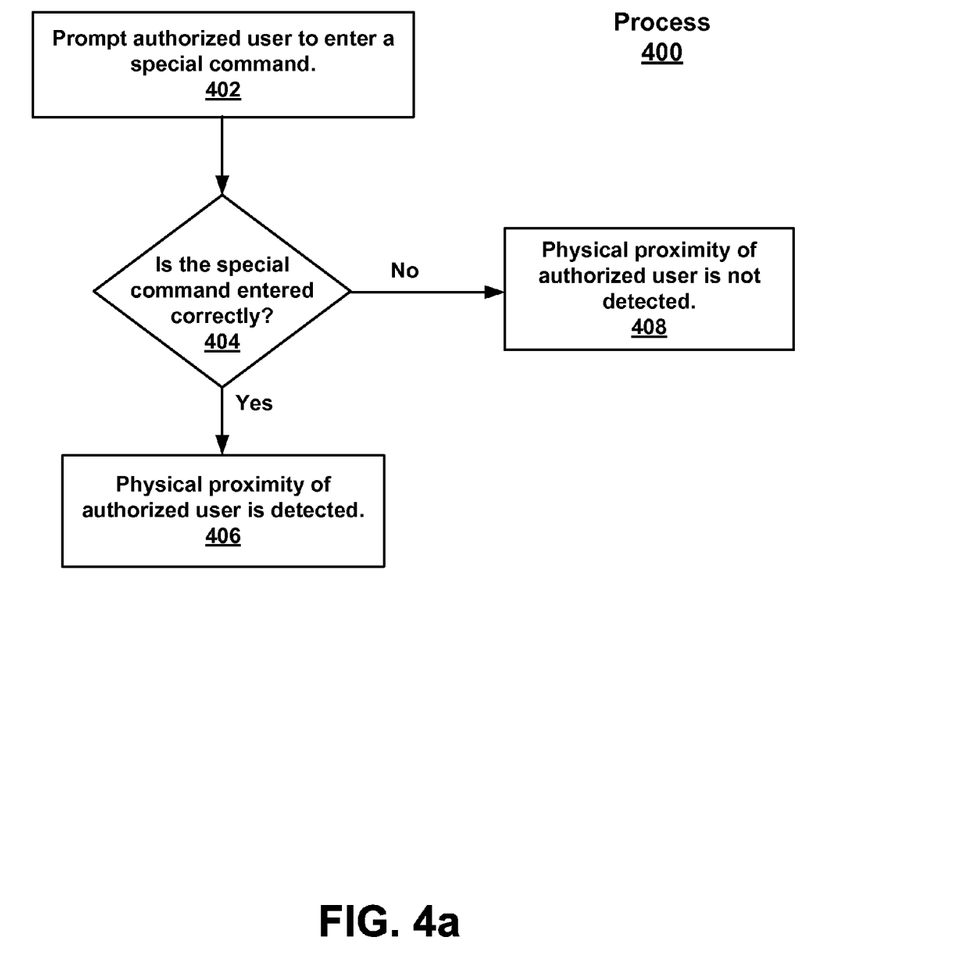
FIG. 4a illustrates a flowchart of an example method for monitoring for physical proximity of authorized user using a special command in accordance with an embodiment of the present technology.

In referring to FIG. 4a, a flowchart of an example process 400 of monitoring for physical proximity of an authorized user using a special command in accordance with embodiments of the present technology.

At 402, in one embodiment the present technology prompts the authorized user to enter a special command before detecting the physical proximity of an authorized user as shown in 310 of FIG. 3. For example, it displays a message asking for a special command on display 120 (as shown in FIG. 1). In another embodiment it will prompt for a special command via terminal 140 (as shown in FIG. 1). In yet another embodiment, it will prompt for a special command via a speaker connected to the computer system. It should be appreciated that the special command can be a predetermined password.

At 404, in one embodiment the present technology will determine whether the special command is entered correctly. In one embodiment, this is performed by a subsystem of the computer system. If the special command is entered correctly then process 400 proceeds to step 406 where physical proximity of an authorized user is detected. If it is determined that the special command is not entered correctly then process 400 proceeds to step 408 where physical proximity of an authorized user is not detected. Thus security is enabled by ensuring that only an authorized user who has possession of a correct special command is allowed to perform privileged operations.

Figure 4B:
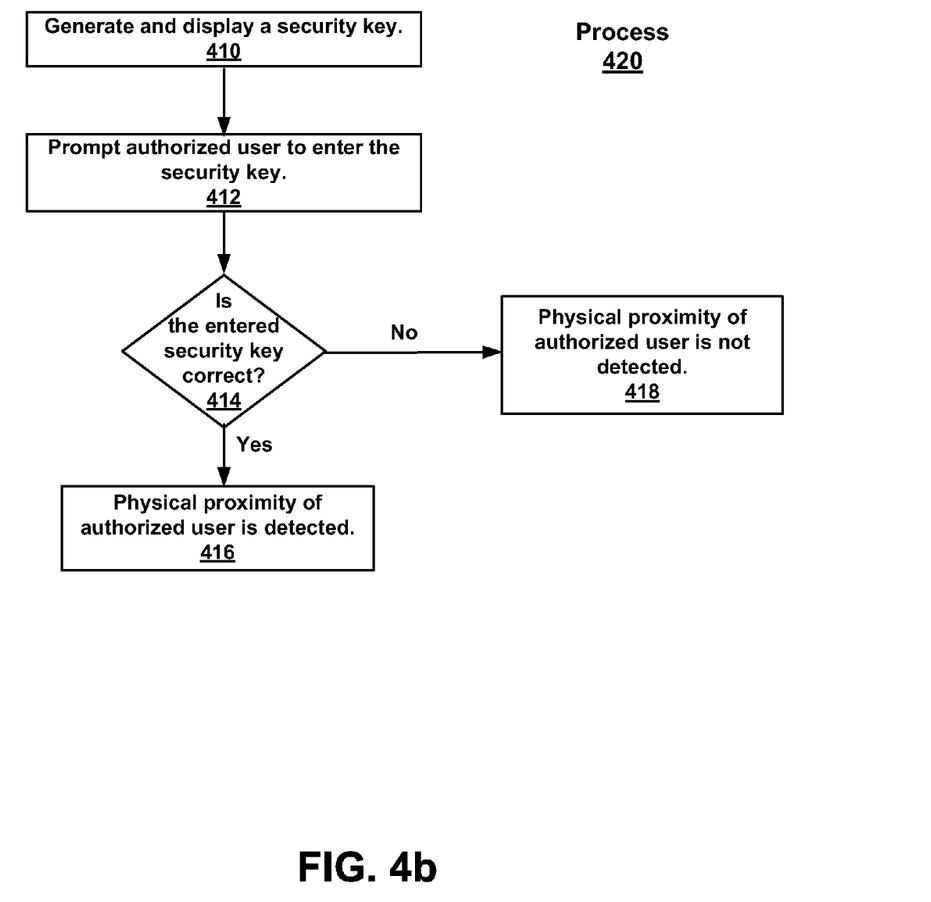
FIG. 4b illustrates a flowchart of an example method for monitoring for physical proximity of authorized user using a security key generated by the computer system in accordance with an embodiment of the present technology.

In referring to FIG. 4b, a flowchart of an example process 420 of monitoring for physical proximity of an authorized user using a security key generated by the present technology in accordance with embodiments described herein.

At 410, in one embodiment, a security key is generated and displayed before detecting the physical proximity of a user as shown in 310 of FIG. 3. The security key may be a random string of alphanumeric characters or it may be selected from a list of predetermined words, phrases, numbers or any combination therein. For example, in one embodiment, the computer system may have a database of numbers, words and phrases. To generate a security key, the computer system will randomly select a number and a word or phrase to display as the security key. It should be appreciated that the security key can be generated in many different ways and is not to be limited to the described embodiments. In one embodiment, the security key is displayed on a pre-existing screen or monitor that is part of the computer system. In another embodiment the security key is displayed on a terminal or laptop computer system connected to the computer system.

At 412, in one embodiment the present technology prompts the authorized user to enter the security key. The present technology is capable of prompting for the security key. In one embodiment, this is accomplished using the same means that it used to display the security key. In another embodiment, it prompts the authorized user using one means while the security key is entered into the computer system through a different means. For example, in one embodiment it prompts for the security key on a on a screen connected to the computer system and the security key is entered using a laptop computer system connected to the computer system.

At 414, in one embodiment the present technology will determine whether the security key is entered correctly. In one embodiment, this is performed by a subsystem of the computer system. If the security key is entered correctly then process 420 proceeds to step 416 where physical proximity of an authorized user is detected. If it is determined that the special command is not entered correctly then process 420 proceeds to step 418 where physical proximity of an authorized user is not detected. Thus security is enabled because only an authorized user who is physically in proximity to the display is able to receive the security key and enter it in correctly and then be allowed to perform privileged operations.

Figure 4C:
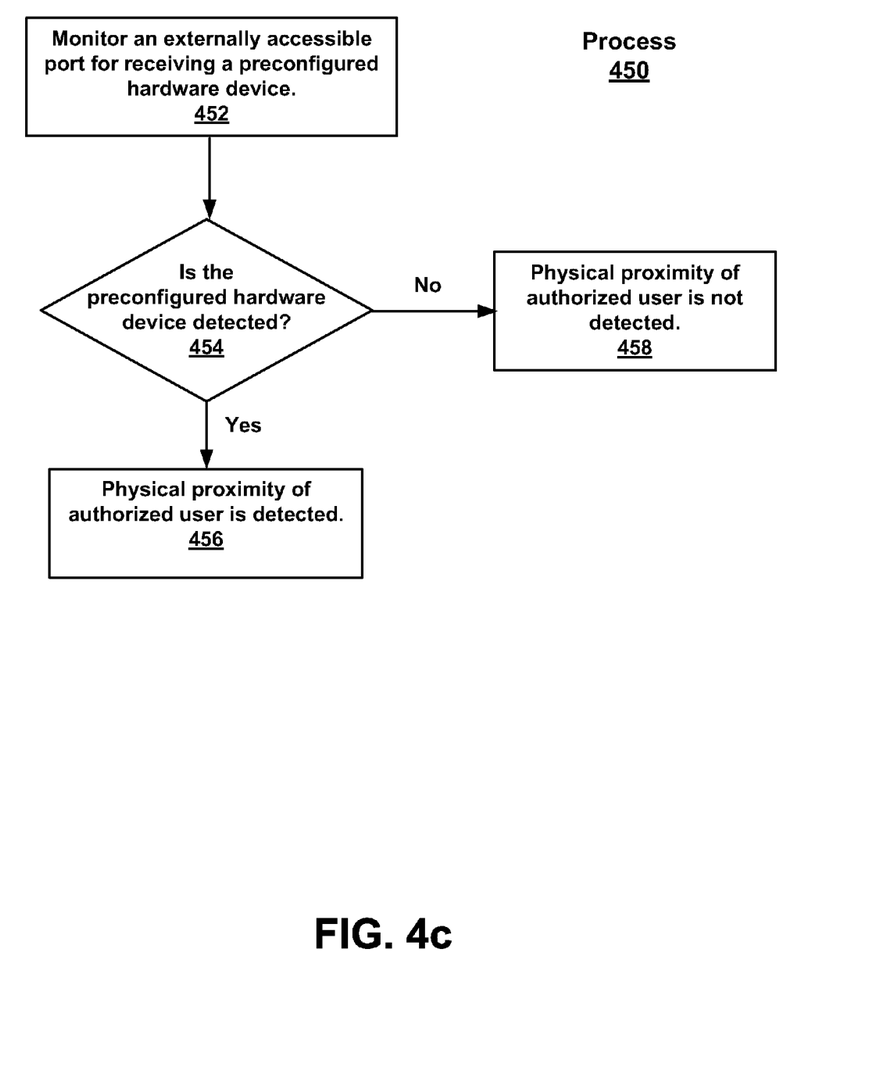
FIG. 4c illustrates a flowchart of an example method for monitoring for physical proximity of authorized user using an externally accessible port with a preconfigured hardware device in accordance with an embodiment of the present technology.

In referring to FIG. 4c, a flowchart of an example process 450 of monitoring for physical proximity of an authorized user using an externally accessible port with a preconfigured hardware device in accordance with embodiments of the present technology.

At 452, in one embodiment the present technology monitors an externally accessible port for receiving a hardware device before detecting the physical proximity of a user as shown in 310 of FIG. 3. In one embodiment, the present technology is capable of distinguishing between different ports on the computer system including differentiating between the data traffic coming from the different ports. For example, in one embodiment the computer system contains an RS232 port and the management processor, or similar entity, is able to distinguish traffic from the RS232 port from that of any other traffic from any other port or interface.

Furthermore, in another embodiment the present technology only allows privileged commands if they are being received from the specified externally accessible port. For example, in one embodiment the computer system is connected to a laptop computer system via a data cable connected to an RS232 port located on the computer system. In such an embodiment, privileged operations may only be executed if they are received by special commands sent by the laptop computer system to the computer system via the RS232 port.

At 454, in one embodiment the present technology determines if the preconfigured hardware device detected. In one embodiment, this is performed by a subsystem of the computer system. If the preconfigured hardware is detected then process 450 proceeds to step 456 where physical proximity of an authorized user is detected. If the preconfigured hardware is detected then process 450 proceeds to step 458 where physical proximity of an authorized user is not detected. Thus security is enabled because only an authorized user who has possession of a preconfigured hardware device is allowed to perform privileged operations.

Figure 4D:
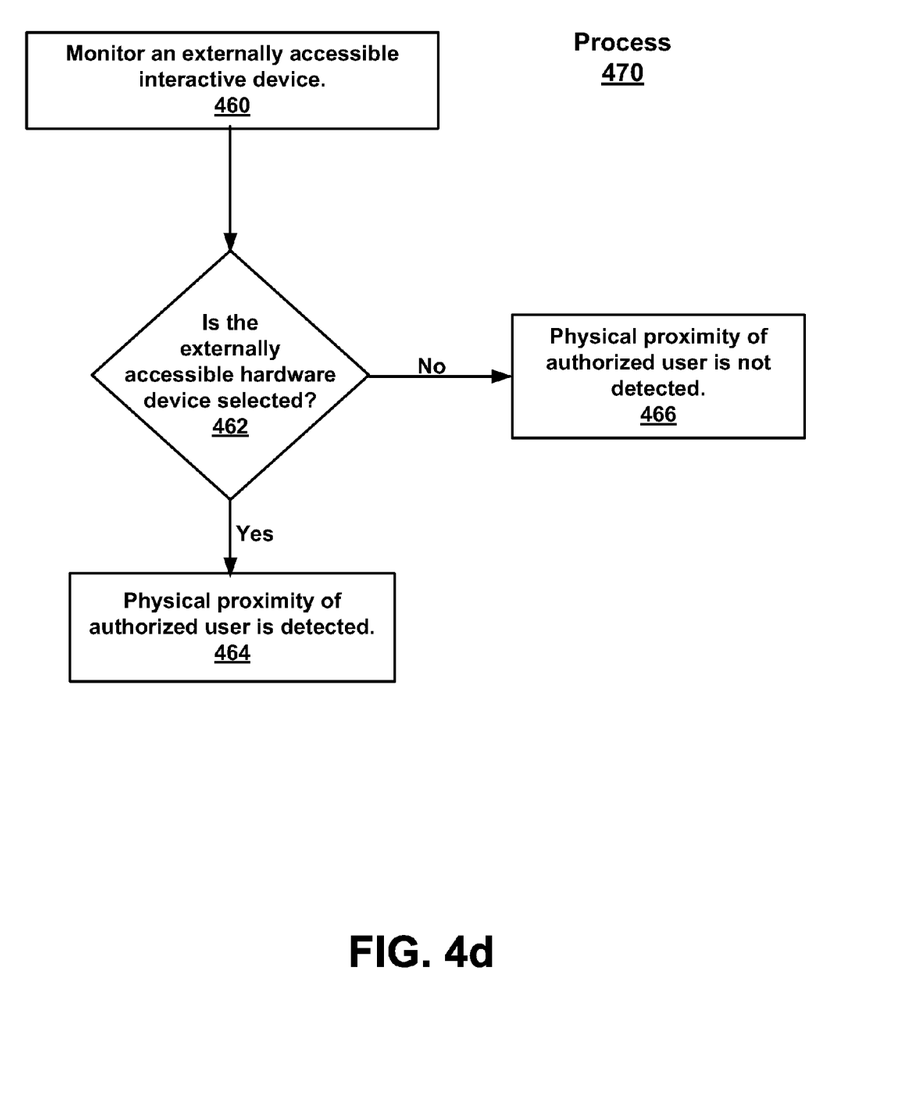
FIG. 4d illustrates a flowchart for monitoring for physical proximity of authorized user using an externally accessible interactive device in accordance with an embodiment of the present technology.

In referring to FIG. 4d, a flowchart of an example process 470 of monitoring for physical proximity of an authorized user using an externally accessible interactive device in accordance with embodiments of the present technology.

At 460, in one embodiment the present technology monitors an externally accessible interactive device. The externally accessible interactive device is capable of being selected after some physical interaction with the authorized user. For example, in one embodiment the computer system is a server which is part of a large group of servers. In such an embodiment, connected to the server is a preexisting locator button that, when pressed, identifies to the authorized user where the server is physically located among the other servers by means of an LED or other indicator. In such an embodiment, the externally accessible interactive device may be the preexisting locator button that is selected when pressed for more than a predetermined amount of time. By indicating when access is allowed to perform privileged operations security is enabled because an authorized user is able to quickly be aware if privilege is allowed to any user and then the authorized user can take action accordingly.

At 462, in one embodiment the present technology determines if the externally accessible interactive hardware is selected. In one embodiment, this is performed by a subsystem of the computer system. If the externally accessible interactive hardware is selected then process 470 proceeds to step 464 where physical proximity of an authorized user is detected. If the externally accessible interactive hardware has not been selected then process 470 proceeds to step 466 where physical proximity of an authorized user is not detected. Thus security is enabled because only an authorized user who is granted physical access to the computer system is able to physically select the interactive hardware device which unauthorized users would be unable to do.

Referring now to 310 of FIG. 3, in one embodiment, the computer system detects whenever an authorized user in physical proximity to the computer system. If the computer system does not detect the physical proximity of an authorized user then the computer system goes back to 305 and continues to monitor for physical proximity. If physical proximity is detected then the computer system will move on to step 315.

At 315, in one embodiment, the present technology allows the authorized user access to privileged operations of the computer system in response to detection of an authorized user in physical proximity to the computer system. For example, in one embodiment, an authorized user is allowed access to the privileged operations via an exterior terminal that allows interactions between a management subsystem and a computer user.

Furthermore, in various embodiments, the purpose of the management subsystem is to allow the privileged operations to be performed once physical proximity has been detected. It should be appreciated that the management subsystem can be composed of, but is not limited to, a management processor, a chipset, firmware, software, a logic device or any other type of hardware device which may be combined with hardware or firmware. The management subsystem can also use existing components in the computer system, for example existing system interfaces could be used. Such interfaces can be a baseboard management controller (BMC) command line interface, system console, extensible firmware interface (EFI) shell, the operation system, etc.

At 320, in one embodiment the present technology prohibits access to privileged operations after a predetermined amount of time since allowing access. For example, in one embodiment the computer system monitors the authorized user's performance of privileged operations for activity. Once there is no activity for a predetermined amount of time then the computer system prohibits access to the privileged operations until an authorized user is again detected in physical proximity to the computer system. In such an embodiment, this can be described as what is known in the art as an automatic timeout. By prohibiting access to privileged operations after a predetermined amount of time the security of the computer system is further enabled because an unwanted user is prevented from being allowed access to privileged operations after the authorized user is finished performing privileged operations and the predetermined amount of time has passed.

At 325, in one embodiment, the present technology generates an externally located indicator which indicates that the authorized user is allowed said access to the privileged operations of the computer system. For example, in one embodiment a speaker makes a sound for a period of time at intervals of a predetermined amount of time. By indicating that access is allowed to privileged operations the security of computer system 105 is further enabled because the authorized user is able to quickly determine when access is allowed and thus make informed decisions as to when to terminate access. Thus unwanted users are less likely to be granted access to privileged operations.

Example Computer System Environment

With reference now to FIG. 5, portions of the technology for providing a communication pathway composed of computer-readable and computer-executable instructions that reside, for example, in computer-usable media of a computer system. That is, FIG. 5 illustrates one example of a type of computer that can be used to implement embodiments of the present technology.

FIG. 5 illustrates an example computer system 500 used in accordance with embodiments of the present technology. It is appreciated that system 500 of FIG. 5 is an example only and that the present technology can operate on or within a number of different computer systems including general purpose networked computer systems, embedded computer systems, routers, switches, server devices, user devices, various intermediate devices/artifacts, stand alone computer systems, mobile phones, personal data assistants, and the like. As shown in FIG. 5, computer system 500 of FIG. 5 is well adapted to having peripheral computer readable media 502 such as, for example, a floppy disk, a compact disc, and the like coupled thereto.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g. random access memory (RAM), coupled to bus 504 for storing information and instructions for processors 506A, 506B, and 506C.

System 500 also includes computer usable non-volatile memory 510, e.g. read only memory (ROM), coupled to bus 504 for storing static information and instructions for processors 406A, 406B, and 406C. Also present in system 500 is a data storage unit 512 (e.g., a magnetic or optical disk and disk drive) coupled to bus 504 for storing information and instructions. System 500 also includes an optional alpha-numeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. System 500 of the present embodiment also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. System 500 also includes an I/O device 520 for coupling system 500 with external entities. For example, in one embodiment, I/O device 520 is a modem for enabling wired or wireless communications between system 500 and an external network such as, but not limited to, the Internet. A more detailed discussion of the present technology is found below.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present technology, for example, is stored as an application 524 or module 526 in memory locations within RAM 508 and memory areas within data storage unit 512. The present technology may be applied to one or more elements of described system 500. For example, a method of physical proximity security may be applied to operating system 522, applications 524, modules 526, and/or data 528.

The computing system 500 is only one example of a suitable computing environment and is not intended to suggest any limitation as to the scope of use or functionality of the present technology. Neither should the computing environment 500 be interpreted as having any dependency or requirement relating to any one or combination of components illustrated in the example computing system 500.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for enabling security of a computer system, said method comprising:
    monitoring for physical proximity of an authorized user with said computer system without requiring said authorized user to physically access the interior of said computer system; and
    in response to detecting said physical proximity of an authorized user with said computer system, allowing said authorized user access to privileged operations of said computer system, wherein said detection is based on physical interaction of said authorized user with said computer system.

2. The method of claim 1, further comprising:
    prohibiting access to said privileged operations after a predetermined amount of time since said detecting.

3. The method of claim 1, wherein said monitoring for physical proximity further comprises:
    prompting said authorized user to enter a special command; and
    determining that said authorized user is in said physical proximity with said computer system provided said special command is entered correctly.

4. The method of claim 1, wherein said monitoring physical proximity further comprises:
    generating a security key;
    displaying said security key proximate to said computer system;
    receiving entry of said key into said computer system; and
    determining that said authorized user is in said physical proximity with said computer system, provided that said entry of said key matches said generated security key.

5. The method of claim 1, wherein said monitoring physical proximity further comprises:
    monitoring said physical proximity at an externally accessible port on said computer system; and
    determining that said authorized user is in said physical proximity with said computer system in response to detecting a preconfigured hardware device received in said port.

6. The method of claim 1, wherein said monitoring physical proximity further comprises:
    monitoring said physical proximity at an externally accessible interactive device on said computer system; and
    determining that said authorized user is in said physical proximity with said computer system in response to detecting that said interactive device is selected.

7. The method of claim 1, further comprising:
    generating an externally located indicator which indicates that said authorized user is allowed said access to said privileged operations of said computer system.

8. A system for enabling access to privileges operations of a computer system comprising:
    an externally accessible interface, configured to allow detection of a physical proximity of an authorized user with said computer system; and
    an access control module communicatively coupled with said interface configured to control access to privileged operations of said computer system, and configured to detect said physical proximity of said authorized user, and in response, allowing said authorized user access to said privileged operations of said computer system, wherein said detection is based on physical interaction of said authorized user with said computer system.

9. The system of claim 8, said access control module configured to prohibit said access to said privileged operations after a predetermined amount of time since said detecting.

10. The system of claim 8, said access control module configured to prompt said authorized user to enter a special command, and configured to determine that said authorized user is in said physical proximity with said computer system provided said special command is entered correctly.

11. The system of claim 8, further comprising:
a display configured to display a security key proximate to said computer system;
wherein said access control module configured to generate said security key, configured to prompt said authorized user to enter said security key as displayed on said display, and configured to determine that said authorized user is in said physical proximity with said computer system provided said security key is entered correctly.

12. The system of claim 8 wherein said externally accessible interface is a port wherein said access control module is configured to detect said physical proximity of said authorized user with said computer system when said port receives a preconfigured hardware device.

13. The system of claim 8 wherein said externally accessible interface is an interactive device wherein said access control module is configured to detect said physical proximity of said authorized user with said computer system when said interactive device is selected.

14. The system of claim 8, further comprising:
an externally located indicator configured to indicate that said authorized user is allowed said access to said privileged operations of said computer system.

15. A tangible computer readable storage medium comprising instructions thereon, when executed cause a computer system to perform a method for enabling security of a computer system based on a physical proximity, said method comprising:
monitoring for physical proximity of an authorized user with said computer system without requiring said authorized user to physically access the interior of said computer system; and
in response to detecting said physical proximity of an authorized user with said computer system, allowing said authorized user access to privileged operations of said computer system, wherein said detection is based on physical interaction of said authorized user with said computer system; and
prohibiting access to said privileged operations after a predetermined amount of time since said detecting.

16. The tangible computer readable storage medium of claim 15, wherein said monitoring physical proximity further comprises:
prompting said authorized user to enter a special command; and
determining that said authorized user is in said physical proximity with said computer system provided said special command is entered correctly.

17. The tangible computer readable storage medium of claim 15, wherein said monitoring physical proximity further comprises:
generating a security key;
displaying said security key proximate to said computer system;
receiving entry of said key into said computer system; and
determining that said authorized user is in said physical proximity with said computer system, provided that said entry of said key matches said generated security key.

18. The tangible computer readable storage medium of claim 15, wherein said monitoring physical proximity further comprises:
monitoring said physical proximity at an externally accessible port on said computer system; and
determining that said authorized user is in said physical proximity with said computer system in response to detecting a preconfigured hardware device received in said port.

19. The tangible computer readable storage medium of claim 15, wherein said monitoring physical proximity further comprises:
monitoring said physical proximity at an externally accessible interactive device on said computer system; and
determining that said authorized user is in said physical proximity with said computer system in response to detecting that said interactive device is selected.

20. The tangible computer readable storage medium of claim 15, wherein the method further comprises:
generating an externally located indicator which indicates that said authorized user is allowed said access to said privileged operations of said computer system.

* * * * *